Jan. 21, 1958 A. E. CARLSON ET AL 2,820,841

PHOTOVOLTAIC CELLS AND METHODS OF FABRICATING SAME

Filed May 10, 1956

INVENTORS
ALLAN E. CARLSON
LEBO R. SHIOZAWA
JOEL D. FINEGAN

BY [signature]
ATTORNEY

United States Patent Office 2,820,841

Patented Jan. 21, 1958

2,820,841

PHOTOVOLTAIC CELLS AND METHODS OF FABRICATING SAME

Allan E. Carlson, Euclid, and Lebo R. Shiozawa and Joel D. Finegan, Cleveland, Ohio, assignors to Clevite Corporation, Cleveland, Ohio, a corporation of Ohio Application May 10, 1956, Serial No. 583,980

21 Claims. (Cl. 136—89)

Figure 1:
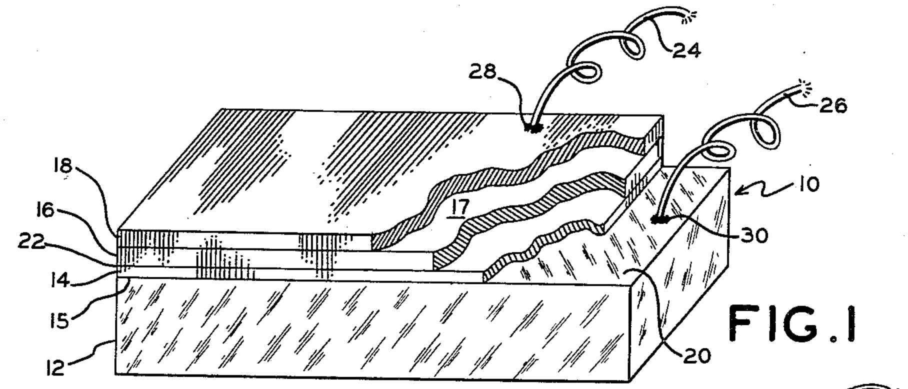

This invention relates to photovoltaic cells and methods of fabricating same, particularly cells embodying polycrystalline films of cadmium sulfide.

The photo sensitivity of single crystals and polycrystalline films of cadmium sulfide has been known and has been the subject of experimentation in the art for some time. The photoconductive effect, particularly, of cadmium sulfide films has found practical application in such devices as television pickup tubes wherein the cadmium sulfide film forms the target. As is well understood in the art, the photoconductive effect may be defined as the changing of the electrical resistivity (specific resistance) of a material in response to variations in the intensity of incident radiation. The range of wave lengths of radiation to which any given photosensitive material responds (hereinafter referred to as the "photoeffective radiation") is a specific property of the particular material. For cadmium sulfide this range includes a substantial portion of the visible spectrum (viz., up to 5200 Angstroms for pure cadmium sulfide) which fact enhances the importance of the photoconductivity of cadmium sulfide in many applications, such as that already mentioned.

The present invention, however, is concerned primarily with the photovoltaic response of cadmium sulfide, the photoconductive effect being of only secondary or incidental importance. The utilization of a photoconductive response requires the provision of an independent external source of electrical voltage; the current drawn from this source is controlled (i. e., varied) by the varying resistance of the cadmium sulfide or other photoconductive material in response to variations of incident radiation. On the other hand, a photovoltaic cell is capable of generating in itself a substantial quantity of electrical energy from incident photoeffective radiation. The open-circuit potential developed by any given cell is dependent on the intensity and spectral distribution of incident radiation and the electronic properties of the photovoltaic junction; the magnitude of current output is dependent on the internal series resistance of the cell, the external load resistance, and the total effective radiation to the junction. Thus, such a device can convert photoeffective radiation directly to electrical energy.

Attempts have been made in the past to devise photovoltaic cells utilizing small single crystals of cadmium sulfide. Work along this line has been reported in The Physical Review, vol. 96 (2nd series), No. 2, at page 533 et seq. by D. C. Reynolds, G. Leies, L. L. Antes and R. E. Marburger. While a degree of success in the qualitative sense may be expected with such crystals as are commercially available, the magnitude of the energy developed, being related to and therefore limited by the relatively small size of the crystals, leaves much to be desired, or is wholly inadequate for many practical applications. The use of mosaics of such single crystals would involve the manual assembly of a number of small crystals or plates cut therefrom, a tedious and time-consuming procedure which would tend to render the finished product prohibitively expensive.

Insofar as is known, no successful attempt has been made to utilize polycrystalline cadmium sulfide in photovoltaic cells, as distinguished from photoconductive cells such as disclosed in U. S. Letters Patent No. 2,688,564 to S. V. Forgue.

While, for the purposes disclosed in the Forgue patent, the dark resistivity of polycrystalline cadmium sulfide films in photoconductive devices is commonly too low without special treatment, photovoltaic cells find many of their most important uses in devices wherein a substantial flow of current is required and, inasmuch as no external voltage is applied, the photosensitive material should have as low an internal resistance as possible. When exposed to photoeffective radiation, the normal light resistivity of pure polycrystalline cadmium sulfide, although significantly lower than the dark resistivity, is nevertheless too high for efficient energy conversion.

As previously mentioned, photovoltaic devices or cells convert photoeffective radiation directly to electrical energy. In cells of the type to which the present invention relates, this is accomplished by a rectifying "junction" or other discontinuity of similar nature and capability. Common forms of such junctions are those formed by contact between (1) a metal (conductor) and a semi-conductor material and (2) two semi-conductor materials, of different conductivity types. The latter class of junctions is known in the art as a "p-n" junction and is used, for example, in silicon and germanium transistors and diodes. Thus it will be seen that photovoltaic cells of the type under consideration involve the intimate physical contact or an interface between two materials. In the following description it will be seen that, in cells according to the present invention one of these materials is, in all cases, polycrystalline cadmium sulfide, pure or containing certain selected impurities; the other material is variable. The polycrystalline cadmium sulfide will be referred to as "bulk material"; the second material completing the junction will be referred to as the "barrier layer or material."

The present invention can be better understood in the light of a brief description of what is believed to be the mechanism of photovoltaic generation involved therein. Incident radiation striking the materials forming the junction is absorbed and causes the formation of electron-hole pairs (charge carriers) in the bulk material. In response to the concentration gradient thus created minority charge carriers diffuse or drift across the junction and give rise to a condition of non-equilibrium concentration of charge carriers in the neighborhood of the junction. This condition and the rectifying property of the junction allows the building up of an electrical potential which in turn, causes an electric current to flow in an external circuit.

The present invention contemplates a photovoltaic cell comprising a layer of polycrystalline cadmium sulfide and a photovoltaic barrier layer in intimate physical contact along an interface of substantial area. The barrier layer is composed essentially of a material comprising monovalent cations of at least one metal from group IB of the periodic table said group consisting of copper, silver, and gold. The cell further comprises electrode means individual to and conductively associated with each of the layers at locations spaced from the interface.

According to another feature of the invention, a photovoltaic cell comprises a layer of polycrystalline cadmium sulfide which contains an impurity "doping agent" consisting of gallium or indium, in elemental form or as their sulfide compounds.

According to another feature of the invention the method of fabricating photovoltaic cells comprises the steps of applying on a supporting surface, sequentially but not necessarily in the order named, a layer of polycrystalline cadmium sulfide and a layer of a material comprising monovalent cations of at least one metal from group 1B of the periodic table. The supporting surface, with the layers thus applied is subsequently baked under predetermined conditions of time and temperature to activate the cell.

According to still another feature of the invention, the method of fabricating photovoltaic cells includes the further step of reducing the internal series resistance of the cadmium sulfide layer by introducing into the layer an impurity selected from the group consisting of indium, gallium, and their sulfide compounds.

It is a fundamental object of the present invention to overcome at least one of the aforementioned problems of the prior art.

More specifically, it is an object of the invention to provide novel large area photovoltaic cells and methods of fabricating same.

Another object of the invention is the provision of novel photovoltaic cells comprising large area films of polycrystalline cadmium sulfide.

A further object of the invention is the provision of novel large area photovoltaic cells characterized by relatively high power conversion efficiencies.

A still further object is the provision of novel photovoltaic cells comprising polycrystalline cadmium sulfide having comparatively low internal series resistance.

Another object of the invention is the provision of methods of easily and inexpensively fabricating large area cadmium sulfide photovoltaic junctions.

Figure 2:
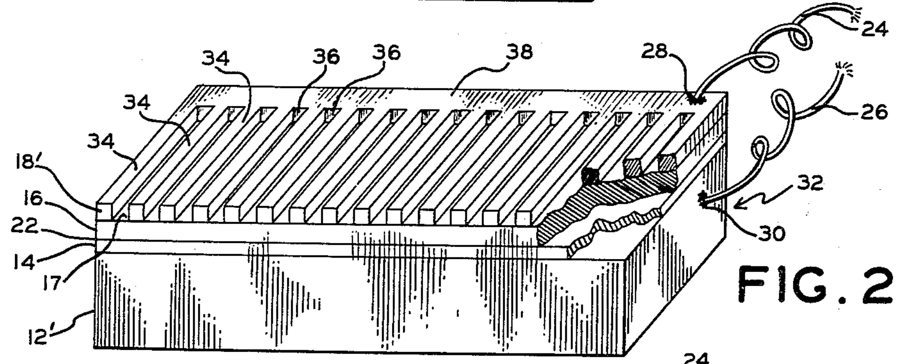
Figure 3:
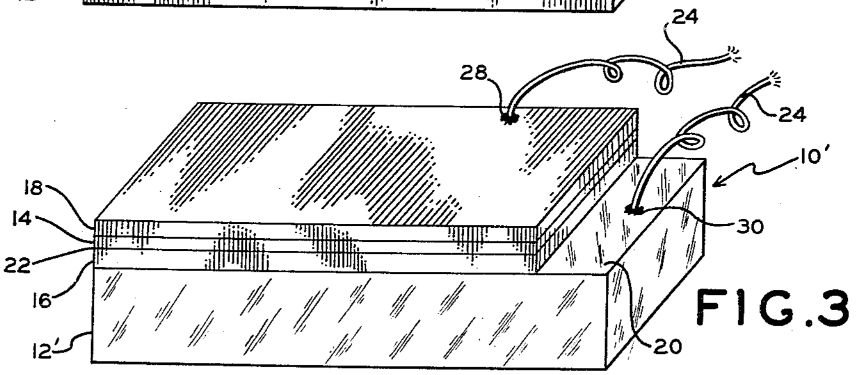
Figure 4:
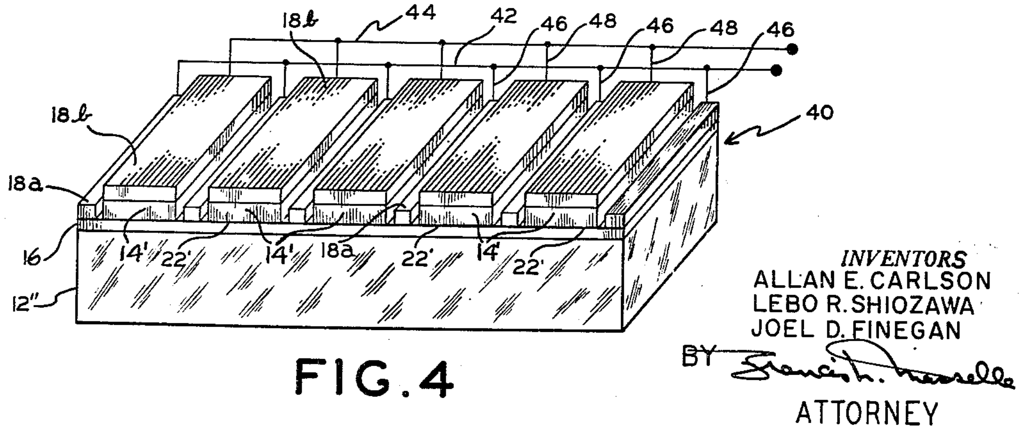

These and further objects of the invention and the manner of their accomplishment will be readily apparent to those conversant with the art from a reading of the following description and subjoined claims in conjunction with the annexed drawing, in which, Figure 1 is a perspective elevational view of a photovoltaic cell embodying the present invention; and Figures 2, 3, and 4 are perspective elevational views, respectively, of three further embodiments of the invention.

Before proceeding with a description of the various exemplary physical embodiments of the invention, the broad underlying concept will be described. As previously mentioned photovoltaic cells according to the invention comprise a layer of polycrystalline cadmium sulfide and, in surface contact therewith a photovoltaic barrier layer as hereinafter explained in detail. The contact between these two layers creates a photovoltaic junction in the region of (i. e., at or near) the interface between them. It is believed that this junction is of the p-n type and that the mechanism of photovoltaic generation involves the formation of electron-hole pairs in the cadmium sulfide layer in response to the action of incident photons of photoeffective radiation. As previously explained, the minority charge carriers diffuse or drift across the junction thus creating a potential difference thereacross which, in turn, causes an electric current to flow in an external circuit.

Thus it will be seen that operation of photovoltaic cells according to the invention requires that at least a substantial portion of the energy of the incident radiation reach the photovoltaic junction. This energy transmission thus involves: (1) the process of light transmission through the junction-forming material, (2) absorption of the photons by the crystal lattice to form electron-hole pairs, and (3) diffusion of the electrons and holes through the lattice to the junction.

The energy conversion efficiency of this junction (light to electrical energy) as in all photovoltaic junctions, depends on the electrical and optical characteristics of the bulk material adjacent the junction, in this case, the layer of cadmium sulfide and the barrier layer. These characteristics include both the ordinary electrical resistivity and the semiconduction parameters involving the mobility and life-times of the electrical charge carriers generated by the incident photoeffective radiation.

From this explanation it will be understood that three basic requirements are imposed on cells embodying the present invention, viz., (1) the photoeffective radiation, or at least a substantial fraction thereof, must have access to the bulk material (cadmium sulfide) in which the charge carriers are formed; (2) the cadmium sulfide layer must be thick enough to absorb the radiation with consequent formation of the charge carriers; and (3) if the radiation enters the cadmium sulfide layer from the surface opposite that forming the junction, the layer must be thin enough, in relation to its optical and semiconducting properties, to allow the minority carriers to migrate to the junction before re-combination with majority carriers occurs.

In the following description, allusions to and specifications of the thickness of the layers forming the junction are made in the light of the foregoing requirements and are for the purpose of example rather than limitation.

Referring now to Figure 1, numeral 10 designates generally a photovoltaic cell according to the present invention. In this particular embodiment, cell 10 consists of a laminated composite structure made up of four substantially coextensive planar laminations 12, 14, 16 and 18. The thickness dimension of the laminations is greatly exaggerated in the drawings for ease and clarity of illustration.

The lowermost lamination 12 is primarily a support member and consists of a plate of electrically conductive glass. Such glass is known and commercially available under various trade names, e. g., "EC" and "NESA." Conductive glass has at least one major surface rendered conductive by treatment such as the fusion thereon of a very thin layer of stannic oxide ($SnO_2$) which in no appreciable way detracts from the transparency of the glass. In Figure 1 glass plate 12 is oriented with its conductive surface, designated 20, facing upwardly. Superimposed upon surface 20 and in intimate physical contact therewith is lamination 14, which covers the entire surface except for a small area at the right hand end of plate 12.

Lamination 14 is a microscopically thin film, from 0.01 to 0.1 micron in thickness, of a material comprising monovalent cations of a metal from group 1B of the periodic table, viz., copper, silver or gold. Preferably the film which forms lamination 14 is composed of a compound selected from the group consisting of cuprous oxide, cuprous sulfide, and silver sulfide, although other compounds of the group 1B metals would provide monovalent positive ions as required by the present invention. The specific thickness of lamination 14 is not critical but it must be thin enough to allow radiation coming through plate 12 to pass through to lamination 16 without substantial optical absorption, quantitative or qualitative, unless the radiation has access to lamination 16 from the opposite direction as will be hereinafter explained.

Lamination 16 consists of a very thin film, for example 0.2 to 10 microns thick, of polycrystalline cadmium sulfide in intimate physical contact with lamination 14 along an interface 22. The laminations 14 and 16 are substantially coextensive and form a photovoltaic junction in a plane at or in close proximity to the interface 22. The surfaces 15 and 17, respectively, of laminations 14 and 16 may be considered as the "external" surfaces relative to those along interface 22. At least one of the surfaces 15 and 17 must be adapted for exposure to the photoeffective radiation, the operation of the cell being similar in either case. It is essential, however, that the radiation have access to the cadmium sulfide lamination 16. Therefore, if the radiation is to enter through plate 12, as is the case in this particular embodiment, lamination 14 should be as thin as practicable so as not to absorb appreciable quantities of the available radiation or filter out photoeffective wavelengths. A maximum thickness of 0.1 micron for lamination 14 is preferred.

Regardless of the direction of the incident radiation lamination 16 must be thick enough to absorb all or at least a substantial part of such radiation, with charge carrier formation. In addition, if the radiation enters through surface 17, lamination 16 must be thin enough to allow the minority carriers to migrate to the junction before re-combination with majority carriers. These requirements are met by a thickness of 0.2 to 10 microns for lamination 16, with 0.5 to 0.7 micron preferred.

Continuing with the description of Figure 1, the uppermost lamination 18 of cell 10 is an electrode, preferably of a material capable of making ohmic or non-rectifying contact with polycrystalline cadmium sulfide. Included in and preferred among such materials are gallium and indium. In the particular embodiment being described lamination 18 is a continuous layer coextensive with and superimposed upon cadmium sulfide lamination 16. The thickness of lamination 18 is illustrated as being comparable to that of lamination 16 but this relation is immaterial. In a cell such as 10 wherein the exciting energy has access to interface 22 through lamination 12 and 14, the lamination 18 may be as thick as necessary or expedient without effect upon the operation.

The chemical purity of the cadmium sulfide constituting lamination 16 is relatively high but the exact degree of purity depends on the intended application of the cell. The normal color of polycrystalline cadmium sulfide of high purity is a canary yellow: it absorbs light radiations having wavelengths below 5200 Angstrom units. Higher wavelengths, including yellow, red, and infra-red, pass through the cadmium sulfide without appreciable absorption and, therefore, are not useful for producing a photoconductive effect nor a photovoltaic effect, since the latter depends on absorption of incident photons.

According to the invention, the cadmium sulfide lamination 16 may be intentionally contaminated or doped with certain impurities which darken the film and have the effect of making it more light absorbent in the red end of the spectrum, and also of decreasing its specific resistance. Such impurities or doping agents may comprise approximately 0.01 to 10.0% by weight of the cadmium sulfide film. It will be appreciated that where a relatively high current output or sensitivity to wavelengths toward the red end of the spectrum is necessary or desirable, cadmium sulfide containing certain impurities would be preferred; in applications where a high voltage and negligible current is satisfactory cadmium sulfide of higher purity would be preferred. The matter of impurities will be dealt with in greater detail in conjunction with the method of fabricating the cell.

The structure thus far described constitutes the essential elements of photovoltaic cell 10, per se. For connection in a suitable electrical circuit (not shown) conductive leads 24 and 26 are provided and secured, as by soldering at 28 and 30, respectively, to the upper surface of lamination 18 and the projecting or bare portion of electrically conductive surface 20 of plate 12.

While the specific scientific theory underlying the action of the cell has not been thoroughly formulated, it is believed that cell 10 and the modifications hereinafter described operate on a principle generally similar to that of the silicon "solar battery." The silicon battery employs a photovoltaic junction between p-type and n-type silicon. In accordance with recently developed but fully accepted theories of conduction in semiconductor materials, energy supplied by incident photons induces a drift or transfer of electrons or holes across the p-n junction resulting in the development of a positive potential in one material and a negative potential in the other and consequently in a flow of current through an external short circuit of said materials. Cadmium sulfide is normally an n-type semiconductor; therefore the operation of the photovoltaic cells disclosed herein may not be strictly analogous to the silicon cell.

It is believed that the barrier layer material (lamination 14) and the cadmium sulfide (lamination 16) combine at the interface 22 to form a thinner layer at or near interface 22 which is p-type, giving, with the n-type cadmium sulfide, a p-n junction. This belief is borne out by the fact that the cells must, in almost all cases, be subjected to a heat treatment before they display any significant photovoltaic response. This heating which will be explained hereinafter in conjunction with the method for fabricating the cells, apparently causes the formation of the p-type material by solid state diffusion between laminations 14 and 16.

The operation of cell 10 is then believed to be as follows: photoeffective radiation incident upon plate 12 is transmitted through the plate, lamination 14, interface 22, and the junction zone (not shown), and is absorbed in the cadmium sulfide lamination 16. The charge carriers formed in the cadmium sulfide migrate back toward and cross the junction, thus create a potential difference or EMF between the electrodes 18 and 20.

In practice, cells of the form shown in Figure 1, having an area of about 10 square centimeters at interface 22 and employing cuprous oxide or cuprous sulfide for barrier layer lamination 14, produced voltages ranging from 0.3 to 0.5 volt under a zirconia arc light with a maximum value of 0.63 volt having been observed. The estimated photovoltaic power conversion efficiency is approximately 0.1% although it is believed that an efficiency in the order of 15 to 20% may ultimately be obtained for sunlight with even higher efficiencies expected under monochromatic radiation.

Aside from the primary utility of the cell as a means of converting light energy to electrical energy, cells having low internal resistance may be used for the rectification of alternating currents inasmuch as all photovoltaic junctions are rectifiers also.

Another embodiment of the invention, designated generally by reference character 32, is shown in Figure 2 wherein parts in common with those in Figure 1 are designated by like reference characters and corresponding though modified parts are identified by primed reference characters. Cell 32 is generally similar in structure and operation to cell 10 with the differences stemming primarily from the fact that the lowermost or supporting lamination 12' in Figure 2 is a plate of a conductive metal, preferably copper. Laminations 14 and 16 are identical to the corresponding laminations in Figure 1. However, it may be convenient in some cases, as for example where plate 12' is of copper, to form lamination 14 in situ of cuprous oxide.

Inasmuch as lamination 12' is a metal plate and opaque, it is incapable of transmitting the exciting photons to interface 22. Consequently, it becomes necessary to provide an electrode lamination 18' which will transmit photoeffective radiation to the cadmium sulfide lamination 16. As already explained, the cadmium sulfide lamination 16 would need to be sufficiently thin to allow the minority carriers to reach the junction at interface 22. The primary feature of this modification is the provision of an upper electrode capable of transmitting light. In photovoltaic cell 32 this is accomplished by having the upper electrode lamination 18' in the form of a grid-like structure consisting of solid areas 34 and aperture areas 36. Thus, the solid areas 34 make the necessary electrical contact with the upper surface of lamination 16 while the activating photons may pass unimpeded through the aperture areas 36. Indium or gallium are the preferred materials for lamination 18'.

While the individual solid areas 34 may be interconnected by means of a suitable system of branch wires, it is convenient to have all members constituting solid areas 34 conductively interconnected by virtue of being integral with or connected to a bus 38 running generally perpendicular thereto and, in the analogy to a comb, corresponding to the back of the comb. In this way lead wire 24 conductively secured as by soldering 28 to any point on lamination 18' connects all solid areas 34 in the electrical circuit. Furthermore, inasmuch as lamination 12' is electrically conductive throughout its volume, lead 26 may be connected to an edge of the plate as shown in Figure 2 or, if preferred, to the underside of the plate.

In the arrangement exemplified by photovoltaic cell 32, it is important that the resistivity of lamination 16 be as low as possible because voltages developed at areas of interface 22 which are not directly beneath a solid area portion 34 of lamination 18' must traverse laterally through the lamination to the nearest solid area 34 and therefore encounter a greater effective resistance. From a consideration of this fact it will be understood that, while a solid to aperture area ratio of unity in lamination 18' has been stated as preferred, the ratio may vary and will depend upon optimum balancing of internal resistance on one hand and adequate exposure of the surface 17 to photoeffective radiation on the other. In operation, the photoeffective photons incident on surface 17 form charge carriers in lamination 16 which migrate across the junction at or near interface 22. Except as particularly pointed out, the Figure 2 embodiment is in all respects functionally and structurally similar to that shown in Figure 1.

A third embodiment of the invention, illustrated in Figure 3, is designated generally by the reference character 10' because it is identical to photovoltaic cell 10, Figure 1, except for the fact that in the former the positions of laminations 14 and 16 are reversed with respect to the latter. Thus in cell 10' polycrystalline cadmium sulfide film 16 is superimposed on conductive surface 20 and the lamination 14 forming the photovoltaic barrier is interposed between the cadmium sulfide film and the electrode lamination 18. What has been said above regarding the applicable materials and thickness of the various laminations applies in like manner to the embodiment of Figure 3.

A fourth embodiment of the invention is exemplified by photovoltaic cell 40 illustrated in Figure 4. In this embodiment the supporting lamination 12'' is formed of a plate of ordinary (i. e. non-conductive) glass. A polycrystalline cadmium sulfide lamination 16 corresponding to and in all respects identical to the corresponding lamination in the previously described embodiments is superimposed in intimate physical contact with the entire upper surface of lamination 12''. Superimposed on selected areas of lamination 16 are a plurality of mutually spaced barrier layer film segments 14' having the same characteristics as in previously described embodiments. In a preferred form, film segments 14' are rectangular, parallel to each other, extend entirely across the underlying laminations and cover a major portion of the surface of lamination 16. As clearly shown in Figure 4, the endmost barrier layer film segments 14' are spaced inwardly from the ends of plate 12'' and lamination 16. Superposed on lamination 16 adjacent or between, as the case may be, respective film barrier layer segments 14' are a plurality of elongated electrode members 18*a* which are parallel to and spaced from the respectively adjacent film segments 14' and coextensive in length. Additional electrode members 18*b* are superposed on film segments 14' and are coextensive with the upper surfaces thereof. Electrode members 18*a* and 18*b* are formed of the same materials and are otherwise similar to laminations 18 and 18' of the preceding embodiments. By means of suitable conductors, indicated schematically at 42 and 44, and branch leads 46 and 48, electrodes 18*a* are electrically interconnected to conductor 42, and electrodes 18*b* are electrically interconnected to conductor 44.

From the structure thus far described it will be understood that in cell 40 a plurality of photovoltaic junctions are formed at the interface 22' barrier layer between film segments 14' and the contacting area of CdS lamination 16. Electrodes 18*b* correspond to electrodes 18 and 18' of the earlier described embodiments and electrodes 18*a* are analogous in function to the electrically conductive surface 20 in Figures 1 and 3 and the entire bulk of plate 12' of Figure 2. Inasmuch as the exciting radiation has access to interfaces 22' through glass plate 12'' and lamination 16 the primary purpose of the spacing between electrodes 18*a* and the respectively adjacent barrier layer film segments 14' is to electrically isolate these members so that the circuit between corresponding electrodes 18*a* and 18*b* is through lamination 16, interface 22' and film segments 14'. Nevertheless this spacing could be increased to enable transmission of the exciting photons in cases where lamination 12'' were opaque. It will be understood that the relative areas covered by the electrodes 18*a* on one hand and the barrier layer film segments 14' and electrodes 18*b* on the other would be selected to accomplish an optimum balance between the output of the photovoltaic junction and the internal resistance afforded by the circuit path through lamination 16. In all respects not specifically described, the Figure 4 embodiment is functionally and structurally similar to the cells illustrated in Figures 1, 2 and 3.

The manner in which photovoltaic cells of the type described are fabricated will now be explained with reference to the drawings as necessary.

In fabricating a cell having the configuration and structure of that shown in Figure 1, a plate, of suitable dimensions and any desired thickness, of commercially available electrically conductive glass is provided. The conductive surface 20 thereof is thoroughly cleansed preferably by the successive application of a chemical detergent (such as household laundry detergents), dilute nitric acid, and distilled water. The physical or mechanical properties of the lamination to be subsequently applied to this surface, for example, adhesion, smoothness, uniformity, and attainable thickness, are enhanced by subjecting the glass, after cleaning, to a high voltage (e. g., 4 kv. A.-C.) glow discharge in a high vacuum for at least 10 seconds.

Thereafter the film which comprises lamination 14 is deposited by vacuum evaporation, a technique which, in itself, is well known in the art. The apparatus used operates to cause sublimation of the laminating material from a heated filament or boat of molybdenum, tungsten, tantalum or graphite. The material forming lamination 14 may be deposited in metallic form, for example copper, and then oxidized, in the broad chemical sense, to form the monovalent cationic compound in situ. In this case several loops of the metal in wire form may be draped over the heating filament. Otherwise, where the laminating material is in the form of a powder, for example silver sulfide, it may be evaporated from the heated boat. The vacuum required is in the range $10^{-4}$ mm. of mercury or higher. The deposition is continued until the film is of the desired thickness as previously explained.

Thereafter lamination 16, a film of polycrystalline cadmium sulfide, is deposited in the same manner from a supply in the form of cadmium sulfide powder or single crystals. The potential may be checked by applying a blunt rounded probe of metallic indium to the surface of the cadmium sulfide film and completing a circuit to the conductive surface of the glass plate 12 through a suitably sensitive voltage-measuring instrument.

At this stage of the fabrication the cell most often shows no or only very insufficient photovoltaic response. The cell is then baked at a temperature not in excess of 400° C. for a sufficient time to activate the cell. Inasmuch as baking carried out at too high a temperature and/or for too long a period results in destruction of the junction, care must be exercised in the selection and control of the baking conditions.

The optimum conditions for baking may be determined by periodically checking the output, i. e., the electrical potential generated by the cell under a selected reference condition of photoeffective illumination. Inasmuch as the unbaked cell rarely exhibits an electrical potential materially in excess of 10 millivolts the baking may be carried out under selected conditions within the limits stated above until this electrical potential increases to an apparent maximum which is usually in the order of 0.3 to 0.6 volt. In most cases baking conditions range from 10 to 15 minutes at a temperature of 150 to 250° C. give satisfactory results; the preferred conditions are 200° C. for 15 minutes.

The uppermost lamination 18 may be deposited by vacuum evaporation in the manner described for laminations 14 and 16 or an air-drying conductive paste may be used.

As has previously been mentioned it is desirable, particularly where the cell finds application in a device requiring substantial curent outputs, that the internal series resistance of the cadmium sulfide film be minimized. In addition, it has been explained that this result may be accomplished by control of the impurities in the film, and also that the cells illustrated and described in certain forms, are characterized by cadmium sulfide laminations which may contain selected impurities or doping agents. The manner in which these effects are accomplished will now be described.

In the absence of light, the specific resistance (dark resistivity) of very pure cadmium sulfide is very high, being in the order of $10^9$ to $10^{12}$ ohm-centimeters. The incident radiation effective to generate voltage in any of the embodiments herein described lowers the internal series resistance by a factor of 100 to 1,000,000.

The resistivity of cadmium sulfide films depends on two factors: (1) impurities in the film and (2) the evaporating conditions and heat treatment. These factors are closely related as will be seen from the following discussion. When the evaporating conditions are such as to deposit the film rapidly, the high temperature required results in some decomposition, the products of which contaminate the cadmium sulfide film and lower its specific resistance. Accordingly where the minimum series resistance is desired, the cadmium sulfide film should be formed at high temperatures. Films containing impurities are characterized by a deep reddish color in contrast to the canary yellow of the pure films.

It has also been found that the resistivity of polycrystalline cadmium sulfide films can be reduced by contamination or doping with gallium, indium or their sulfide compounds, preferably indium sulfide.

The impurity doping of the cadmium sulfide film to lower the internal resistivity of the latter is accomplished by applying a film of the doping agent on the cadmium sulfide film prior to the baking step outlined above. In most cases the temperature of baking to activate the cell is sufficient also to cause interdiffusion of the doping agent and the cadmium sulfide but a longer baking time is usually required. While activation is indicated by a rising open circuit voltage with baking time, the optimum time and temperature for interdiffusion is indicated by a pronounced lowering of the series resistance as reflected by an increased power output. Over-baking causes destruction of the junction either by (1) disappearance of lamination 14 by interdiffusion, or (2) "drowning" by diffusion of too much of the doping agent into lamination 14.

Cells having low internal resistance may also be formed by simultaneous or co-evaporation of the cadmium sulfide and the doping agent. However, better control can be expected by successive application of the films followed by baking to cause interdiffusion. In any case the preferred amount of impurity amounts to about 0.01 to 10.0% by weight of the bulk material, as previously mentioned.

A photovoltaic cell of the type illustrated in Figure 2 may be fabricated generally as outlined above except that if the metal of plate 12' is one of the group 1B metals it may be possible to form the lamination 14 in situ. Assuming for the sake of example that 12' is a copper plate, the surface to which lamination 14 is to be applied can be thoroughly cleaned to remove existing films and then oxidized, as by heating in an air atmosphere for about 10 minutes at 150 to 200° C., to form a film of cuprous oxide.

The grid-like lamination 18' may be achieved by masking open areas 36. A similar system would be employed in the formation of film segments 16' in the Figure 4 embodiment.

Except where otherwise noted or explained the method for fabricating all four embodiments is generally the same.

While there have been described what at present are considered to be the preferred embodiments of this invention, it will be obvious to those skilled in the art that various changes and modifications can be made therein without departing from the invention, and it is aimed, therefore, in the appended claims to cover all such changes and modifications as fall within the true spirit and scope of the invention.

What we claim is:

1. A photovoltaic cell comprising a layer of polycrystalline cadmium sulfide and a second layer, said layers being in intimate physical contact along an interface of substantial area and forming a photovoltaic junction in the region of and substantially coextensive with said interface, said second layer being a photovoltaic barrier layer composed of a material comprising monovalent cations of at least one metal from group 1B of the periodic table; and electrode means individual to and conductively associated with each of said layers at locations spaced from said interface.

2. A photovoltaic cell comprising a layer of polycrystalline cadmium sulfide and a photovoltaic barrier layer, said layers being in intimate physical contact along, and forming a photovoltaic junction in the region of, an interface of substantial area, said barrier layer being composed essentially of a material comprising monovalent cations of at least one metal from group 1B of the periodic table, said cadmium sulfide layer and barrier layer having external surfaces opposite those in contact, at least one of which external surfaces is adapted for exposure to incident radiation, said cadmium sulfide layer being thick enough to absorb at least a substantial part of the photoeffective wavelengths of the radiation incident upon the external surface thereof with consequent formation of charge carriers in said cadmium sulfide layer and being thin enough to allow minority charge carriers thus formed to migrate to said junction before re-combination with majority carriers, said barrier layer being thin enough to transmit to said cadmium sulfide layer at least a substantial part of the photoeffective radiation incident upon the external surface of said barrier layer; and electrode means individual to and conductively associated with the external surfaces of each of said layers.

3. A photovoltaic cell according to claim 2 wherein said material comprises at least one compound selected from the group consisting of cuprous oxide, cuprous sulfide and silver sulfide.

4. A photovoltaic cell according to claim 3 wherein said cadmium sulfide layer contains from 0.01 to 10% by weight of an impurity selected from the group consisting of indium, gallium and the sulfide compounds thereof.

5. A photovoltaic cell according to claim 4 wherein said electrode means are composed essentially of a metal selected from the group consisting of indium and gallium.

6. A photovoltaic cell comprising a laminated composite body including at least two layers which have confronting surfaces in intimate physical contact along, and form a photovoltaic junction in the region of, an interface of substantial area, one of said layers being composed essentially of polycrystalline cadmium sulfide and the other being a photovoltaic barrier layer composed essentially of a material comprising monovalent cations of a metal from group 1B of the periodic table, said cadmium sulfide layer and barrier layer each having an external surface opposite those in contact, at least one of which external surfaces is adapted for exposure to incident radiation, said cadmium sulfide layer being thick enough to absorb at least a substantial part of the photoeffective radiation incident upon the external surface thereof with consequent formation of charge carriers in said cadmium sulfide layer and being thin enough to allow minority charge carriers thus formed to migrate to said junction before recombination with majority carriers, said barrier layer being thin enough to transmit to said cadmium sulfide layer at least a substantial part of the photoeffective radiation incident upon the external surface of said barrier layer; and electrode means individual to each of said layers and conductively associated with said external surfaces thereof.

7. A photovoltaic cell comprising a laminated composite body including at least two layers which have confronting surfaces in intimate physical contact along an interface of substantial area, one of said layers being composed essentially of polycrystalline cadmium sulfide and the other being a barrier layer composed essentially of a compound of a metal, in a monovalent state, from group 1B of the periodic table, said cadmium sulfide layer being approximately 0.2 to 10 microns in thickness and said barrier layer 0.01 to 0.1 micron in thickness; and electrode means, individual to each of said layers, making ohmic contact with at least a substantial area of the respective surfaces of said layers opposite to said confronting surfaces, at least the one of said electrode means being adapted to transmit at least a substantial fraction of the incident radiation of at least part of the range of wavelengths to which cadmium sulfide responds photoelectrically.

8. A photovoltaic cell comprising a laminated composite body including at least two layers which have confronting surfaces which are in intimate physical contact along and form a photovolataic junction in the region of an interface of substantial area, one of said layers being composed essentially of polycrystalline cadmium sulfide containing an impurity doping agent selected from the group consisting of indium, gallium and their sulfide compounds and the other being a photovoltaic barrier layer composed essentially of a compound of a metal, in monovalent state, from group 1B of the periodic table, said cadmium sulfide layer and barrier layer having external surfaces opposite those in contact at least one of which is adapted for exposure to incident radiation, said cadmium sulfide layer being thick enough to absorb at least a substantial part of the photoeffective radiation incident upon the external surface thereof with consequent formation of charge carriers in said cadmium sulfide layer and being thin enough to allow minority charge carriers thus formed to migrate to said junction before re-combination with majority carriers, said barrier layer being thin enough to transmit to said cadmium layer at least a substantial part of the photoeffective wavelengths of radiation incident upon the external surface of said barrier layer; and electrode means individual to each of said layers and making ohmic contact with said external surfaces of said layers, at least one of said electrode means being adapted to transmit at least a substantial part of the incident photoeffective radiation.

9. A photovoltaic cell according to claim 8 wherein said cadmium sulfide film contains about 0.01 to 10.0% by weight of an impurity doping agent selected from the group consisting of indium, gallium and their sulfide compounds.

10. A photovoltaic cell comprising a composite body made up of four substantially coextensive planar laminations; one of said laminations being a plate of glass having at least one electrically conductive major surface; a second and a third of said laminations consisting individually of a polycrystalline cadmium sulfide film, about 0.5 to 0.7 micron thick, and a film, about 0.01 to 0.1 micron thick, of a material comprising monovalent cations of a metal from group 1B of the periodic table; said second and third laminations having respective confronting major surfaces in intimate physical contact and forming a photovoltaic junction, said laminations being collectively superposed on said glass plate with a major surface of one of said second and third laminations making non-rectifying contact with the conductive surface of said glass plate; and the fourth of said laminations comprising a conductive electrode making non-rectifying contact with the remaining major surface of the other of said second and third laminations.

11. A photovoltaic cell comprising a glass plate having at least one electrically conductive major surface; a film, about 0.01 to 1 micron in thickness, adherently disposed on said surface and consisting essentially of a metallic compound selected from the group consisting of cuprous oxide, cuprous sulfide and silver sulfide; a film of polycrystalline cadmium sulfide about 0.5 to 0.7 micron thick, adherently superposed upon said metallic compound film; and, adherently superposed on said cadmium sulfide film, an electrode consisting of a film of an electrically conductive material making non-rectifying contact with cadmium sulfide.

12. A photovoltaic cell comprising a glass plate having at least one electrically conductive major surface; a film of polycrystalline cadmium sulfide, about 0.5 to 0.7 micron thick, adherently disposed on said surface; a film, about 0.01 to 0.1 micron in thickness adherently superposed on said cadmium sulfide film and consisting essentially of a metallic compound selected from the group consisting of cuprous oxide, cuprous sulfide and silver sulfide; and, adherently superposed on said metallic compound film, an electrode consisting of a layer of an electrically conductive material making non-rectifying contact with said metallic compound film.

13. A photovoltaic cell comprising a glass plate having on a major surface thereof a film of polycrystalline cadmium sulfide about 0.2 to 10 microns in thickness; a plurality of individual, mutually-spaced film segments distributed over and adherently superposed upon said cadmium sulfide film and jointly covering a major portion of the surface of said film, said film segments being composed essentially of a metallic compound selected from the group consisting of cuprous oxide, cuprous sulfide and silver sulfide; a plurality of individual electrode means each conforming generally to and adherently superposed upon respective ones of said film segments; and additional electrode means adherently superposed on said cadmium sulfide film adjacent said film segments and in spaced relation thereto, said additional electrode means jointly covering substantially the entire remaining minor portion of said cadmium sulfide film except for the spacing between said film segments and additional electrode means.

14. A photovoltaic cell comprising a glass plate having on a major surface thereof a uniform adherent, film of polycrystalline cadmium sulfide about 0.2 to 10 microns in thickness; a plurality of generally rectangular film segments, individually much smaller in area than said cadmium sulfide film, distributed uniformly over and adherently superposed on said cadmium sulfide film in mutually spaced relation and with adjacent edges substantially parallel; said film segments jointly covering a major portion of the surface area of said cadmium sulfide film and being composed essentially of a compound selected from the group consisting of cuprous oxide, cuprous sulfide and silver sulfide; electrode means, individual to each of said film segments, consisting of a thin layer of a conductive material, capable of making non-rectifying contact with said compound, adherently superposed said film segments; and elongate electrode members of said conductive material adherently superposed on said cadmium sulfide film adjacent said film segments and in spaced relation thereto, said electrode members jointly covering substantially the entire remaining minor portion of said cadmium sulfide film except for the spacing between said film segments and electrode means.

15. A photovoltaic cell comprising a metallic copper plate having a film of cuprous oxide on a major surface thereof; a film composed essentially of polycrystalline cadmium sulfide, having a thickness in the range of 0.2 to 10 microns, adherently superposed on said plate over said cuprous oxide film; and electrode means of an electrically conductive material making non-rectifying contact with cadmium sulfide, in surface contact with a substantial area of said cadmium sulfide film.

16. A photovoltaic cell according to claim 15 wherein said electrode means comprises a grid-like structure composed essentially of a metal selected from the group consisting of indium and gallium, the ratio of solid to aperture areas of said grid-like structure being approximately unity, the solid areas being conductively interconnected.

17. A method of fabricating photovoltaic cells which comprises the steps of applying on a supporting surface, sequentially but not necessarily in the order named, a film consisting essentially of polycrystalline cadmium sulfide and a film consisting essentially of a material comprising monovalent cations of at least one metal from group 1B of the periodic table; and subsequently baking the supporting surface with the films applied under such conditions of time and temperature, less than 1 hour and 400° C., respectively, that an electrical potential materially in excess of 10 millivolts is manifested between respective electrodes applied to said films when exposed to photoeffective radiation; and discontinuing said baking when such potential reaches an apparent maximum.

18. A method according to claim 17 wherein a film of an impurity doping agent selected from the group consisting of indium, gallium and their sulfide compounds is applied in contact with one surface of said cadmium sulfide film prior to baking.

19. A method according to claim 17 including the further steps of applying a film of an impurity doping agent selected from the group consisting of gallium, indium, and their sulfide compounds in contact with one surface of said cadmium sulfide film after baking and thereafter again baking said support at a temperature less than 400° C. for less than 1 hour so as to cause uniform interdiffusion of said doping agent and cadmium sulfide films.

20. A method according to claim 17 wherein said cadmium sulfide film is applied by vacuum evaporation and an impurity doping agent is incorporated in said film by coevaporation, said doping agent being selected from the group consisting of indium, gallium and their sulfide compounds.

21. The method of fabricating photovoltaic cells which comprises the steps of applying on a supporting surface, sequentially but not necessarily in the order named, a film of polycrystalline cadmium sulfide interposed between a second film composed essentially of a material selected from the group consisting of gallium, indium, and their sulfide compounds and a third film of a compound comprising monovalent cations of a material from group 1B of the periodic table; and baking said member under such conditions of time and temperature, less than 1 hour and 400° C., respectively, as to activate said cell and to produce an appropriate amount of solid state diffusion of said second film into said cadmium sulfide film, the activation of said cell being indicated by the manifestation of an electrical potential in excess of 10 millivolts between said second and third films when exposed to photoeffective radiation and said appropriate diffusion being indicated by a rise in electrical current output from said cell when exposed to such radiation.

References Cited in the file of this patent

UNITED STATES PATENTS

| | | |
|---|---|---|
| 2,582,850 | Rose | Jan. 15, 1952 |
| 2,688,564 | Forgue | Sept. 7, 1954 |
| 2,736,848 | Rose | Feb. 28, 1956 |

OTHER REFERENCES

Reynolds, D. C. et al.: "Photovoltaic Effect in Cadmium Sulfide," The Physical Review (2nd series), 96 (October 1954).

U. S. DEPARTMENT OF COMMERCE

PATENT OFFICE

CERTIFICATE OF CORRECTION

January 21, 1958

Patent No. 2,820,841

Allan E. Carlson et al.

It is hereby certified that error appears in the printed specification of the above numbered patent requiring correction and that the said Letters Patent should read as corrected below.

Column 7, line 60, for "respective film barrier layer segments" read -- respective barrier layer film segments --; line 75, for "22′ barrier layer between" read -- 22′ between barrier layer --; column 8, line 49, after the word "chemical" strike out the comma; column 9, line 18, for "curent" read --current--.

Signed and sealed this 1st day of April 1958.

(SEAL)

Attest:

KARL H. AXLINE

Attesting Officer

ROBERT C. WATSON

Commissioner of Patents